United States Patent
Kwak et al.

(10) Patent No.: US 11,096,125 B2
(45) Date of Patent: *Aug. 17, 2021

(54) METHOD AND APPARATUS FOR POWER CONTROL AND MULTIPLEXING FOR DEVICE TO DEVICE COMMUNICATION IN WIRELESS CELLULAR COMMUNICATION SYSTEM

(71) Applicant: Samsung Electronics Co., Ltd., Gyeonggi-do (KR)

(72) Inventors: Yongjun Kwak, Gyeonggi-do (KR); Joonyoung Cho, Gyeonggi-do (KR); Hyoungju Ji, Seoul (KR); Sangmin Ro, Seoul (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/678,590

(22) Filed: Nov. 8, 2019

(65) Prior Publication Data

US 2020/0077346 A1  Mar. 5, 2020

Related U.S. Application Data

(63) Continuation of application No. 15/784,868, filed on Oct. 16, 2017, now Pat. No. 10,477,489, which is a
(Continued)

(51) Int. Cl.
*H04W 52/24* (2009.01)
*H04W 52/36* (2009.01)
(Continued)

(52) U.S. Cl.
CPC ....... *H04W 52/242* (2013.01); *H04W 52/367* (2013.01); *H04W 52/383* (2013.01);
(Continued)

(58) Field of Classification Search
CPC ............ H04W 52/242; H04W 52/367; H04W 52/383; H04W 72/0413; H04W 72/0473; H04W 52/243
See application file for complete search history.

(56) References Cited

U.S. PATENT DOCUMENTS 9,480,206 B2   11/2016  Hendricks
10,477,489 B2*  11/2019  Kwak ................. H04W 52/383
(Continued)

FOREIGN PATENT DOCUMENTS

CN   101558577   10/2009
CN   102348272    2/2012
(Continued)

OTHER PUBLICATIONS

European Search Report dated Jul. 21, 2016 issued in counterpart application No. 14155402.2-1855, 8 pages.
(Continued)

*Primary Examiner* — Brenda H Pham
(74) *Attorney, Agent, or Firm* — The Farrell Law Firm, P.C.

(57) ABSTRACT

Methods and apparatuses are provided in which at least one parameter associated with a sidelink transmission is received from a base station. It is identified whether an uplink transmission is scheduled in a transmission time interval (TTI) in which a sidelink transmission to a second terminal is scheduled. The sidelink transmission is transmitted to the second terminal in the TTI in case that no uplink transmission is scheduled in the TTI. The sidelink transmission is transmitted based on a smaller transmission power value from two transmission power values.

10 Claims, 12 Drawing Sheets

Related U.S. Application Data continuation of application No. 15/332,628, filed on Oct. 24, 2016, now Pat. No. 9,794,890, which is a continuation of application No. 14/182,924, filed on Feb. 18, 2014, now Pat. No. 9,480,026.

(51) Int. Cl.
*H04W 52/38* (2009.01)
*H04W 72/04* (2009.01)

(52) U.S. Cl.
CPC ... *H04W 72/0413* (2013.01); *H04W 72/0473* (2013.01); *H04W 52/243* (2013.01)

(56) References Cited

U.S. PATENT DOCUMENTS

| | | |
|---|---|---|
| 2006/0168343 A1 | 7/2006 | Ma |
| 2007/0097900 A1 | 5/2007 | Kim |
| 2007/0195731 A1 | 8/2007 | Camp |
| 2008/0069033 A1 | 3/2008 | Li et al. |
| 2008/0069039 A1 | 3/2008 | Li et al. |
| 2008/0069062 A1 | 3/2008 | Li et al. |
| 2008/0270619 A1 | 10/2008 | Davies |
| 2009/0011770 A1 | 1/2009 | Jung |
| 2009/0298522 A1 | 12/2009 | Chaudhri et al. |
| 2010/0093364 A1 | 4/2010 | Ribeiro |
| 2010/0261469 A1 | 10/2010 | Ribeiro et al. |
| 2011/0170431 A1 | 7/2011 | Palanki et al. |
| 2012/0028672 A1 | 2/2012 | Chen et al. |
| 2012/0261469 A1 | 10/2012 | Clark et al. |
| 2012/0269072 A1 | 10/2012 | Wu et al. |
| 2012/0320820 A1 | 12/2012 | Yuda et al. |
| 2013/0053103 A1 | 2/2013 | Kim et al. |
| 2013/0143614 A1 | 6/2013 | Lee et al. |
| 2013/0244585 A1 | 9/2013 | Chen et al. |
| 2013/0316757 A1 | 11/2013 | Li |
| 2014/0098784 A1 | 4/2014 | Iwamura et al. |
| 2014/0153390 A1 | 6/2014 | Ishii |
| 2014/0161111 A1 | 6/2014 | Kim et al. |
| 2014/0198694 A1 | 7/2014 | Yang |
| 2014/0349659 A1 | 11/2014 | Ishii |
| 2015/0327189 A1 | 11/2015 | Seo et al. |

FOREIGN PATENT DOCUMENTS

| | | |
|---|---|---|
| JP | 2009-527940 | 7/2009 |
| JP | 2010-504048 | 2/2010 |
| JP | 2013-500631 | 1/2013 |
| KR | 1020110088765 | 8/2011 |
| KR | 1020120017005 | 2/2012 |
| KR | 10-1110898 | 3/2012 |
| KR | 1020120095811 | 8/2012 |
| KR | 1020120095813 | 8/2012 |
| WO | WO 2008/034044 | 3/2008 |
| WO | WO 2011/114729 | 9/2011 |
| WO | WO 2012/157550 | 11/2012 |
| WO | WO 2012/166969 | 12/2012 |
| WO | WO 2014/001271 | 6/2014 |

OTHER PUBLICATIONS

Chinese Office Action dated Feb. 1, 2018 issued in counterpart application No. 201480009027.5, 14 pages.
Japanese Office Action dated Apr. 9, 2018 issued in counterpart application No. 2015-557947, 5 pages.
Japanese Office Action dated Jan. 4, 2019 issued in counterpart application No. 2015-557947, 6 pages.
Japanese Office Action dated Jun. 1, 2020 issued in counterpart application No. 2019-017790, 6 pages.
Korean Office Action dated Jul. 8, 2020 issued in counterpart application No. 10-2014-0014221, 12 pages.
European Search Report dated Nov. 18, 2019 issued in counterpart application No. 18180560.7-1219, 6 pages.
Indian Examination Report dated Dec. 16, 2019 issued in counterpart application No. 2647/KOLNP/2015, 6 pages.

* cited by examiner

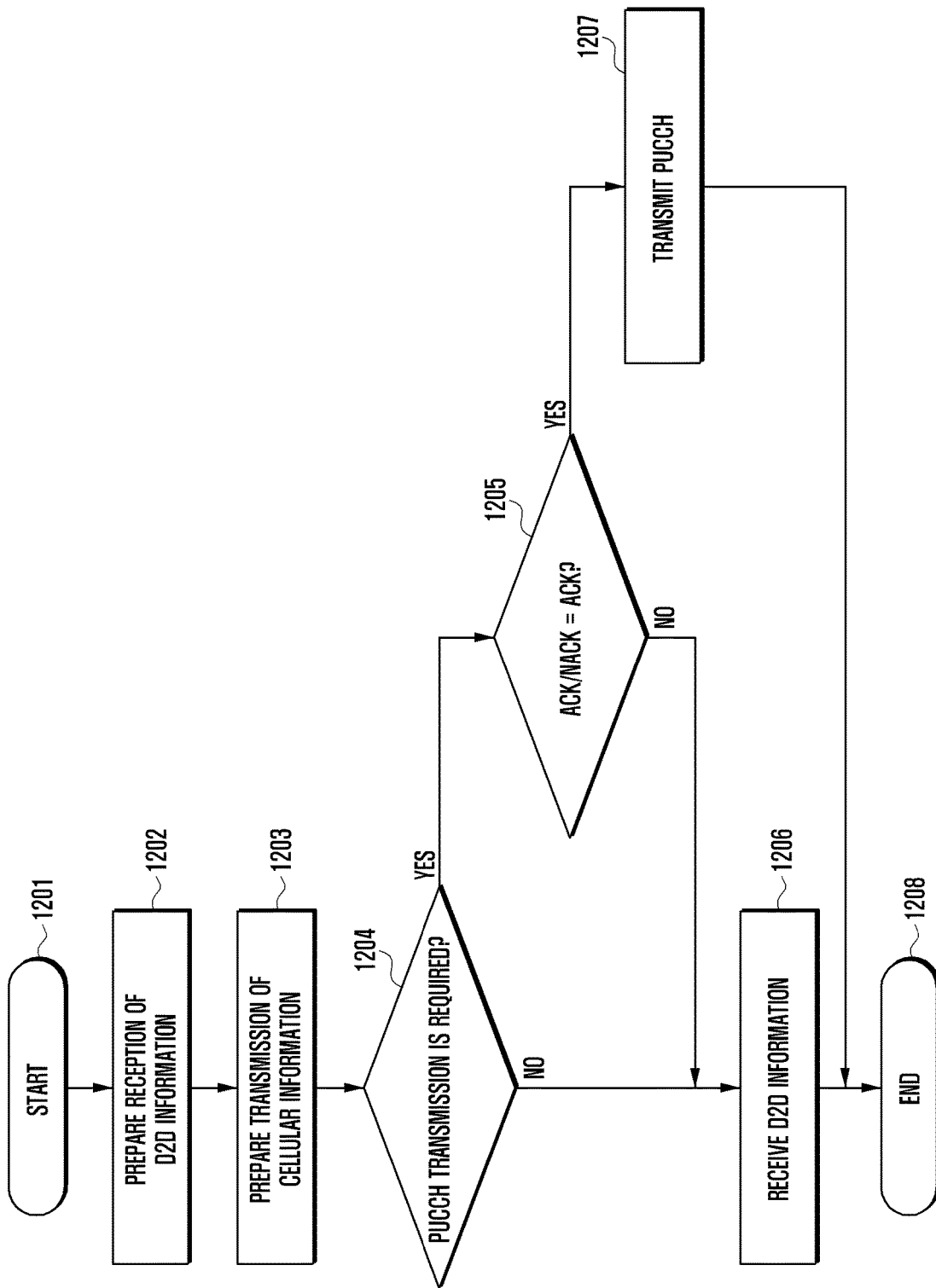

METHOD AND APPARATUS FOR POWER CONTROL AND MULTIPLEXING FOR DEVICE TO DEVICE COMMUNICATION IN WIRELESS CELLULAR COMMUNICATION SYSTEM

PRIORITY

This application is a Continuation Application of U.S. application Ser. No. 15/784,868, filed in the U.S. Patent and Trademark Office (USPTO) on Oct. 16, 2017, which is a Continuation Application of U.S. application Ser. No. 15/332,628, filed in the USPTO on Oct. 24, 2016, now U.S. Pat. No. 9,794,890, issued on Oct. 17, 2017, which is a Continuation Application of U.S. application Ser. No. 14/182,924, filed in the USPTO on Feb. 18, 2014, now U.S. Pat. No. 9,480,026, issued on Oct. 25, 2016, which claims priority under 35 U.S.C. § 119(a) to Korean Patent Application Nos. 10-2013-0016488 and 10-2014-0014221, filed in the Korean Intellectual Property Office on Feb. 15, 2013 and Feb. 7, 2014, respectively, the contents of each of which are incorporated herein by reference.

BACKGROUND

1. Field of the Invention

The present invention relates generally to a wireless mobile communication system, and more particularly, to operations of a User Equipment (UE) including a transmission power control process and a multiplexing process of the UE, operations of a Base Station (BS) corresponding to the operations of the UE, and devices thereof in a state where a device to device communication technology and a wireless cellular communication technology are used together.

2. Description of the Related Art

As types of services using a wireless mobile communication system are significantly diversified, a new technology to more efficiently support newly rising services is required, and accordingly, a new method and new technologies have been developed and researched in the wireless mobile communication system.

Device to Device (D2D) communication is a new technology which has arisen as a solution for a new service and basically enables a predetermined UE to directly communicate with another UE existing in the surroundings of the device. Through the use of the D2D communication technology, the UE may discover UEs existing in the surroundings of the UE itself and perform direct communication with a device requiring communication.

When direct communication is performed between UEs, a large advantage in terms of radio resource efficiency is acquired since the direct communication uses a relatively small amount of radio resources in comparison with communication via a Base Station (BS) using a conventional wireless network. Further, since the direct communication supports a method in which the UE discovers UEs located close to the UE, the UE can directly transmit information to a desired device, thereby greatly increasing efficiency in supporting an advertisement service, a Social Networking Service (SNS), and the like.

Currently, a Long Term Evolution-Advanced (LTE-A) also requires supporting the D2D technology and a technical discussion about the D2D technology is progressing.

FIG. 1 is a view illustrating a scenario where D2D communication is supported within a cellular system.

A BS 101 manages a UE 103 and a UE 104 within a cell 102 managed by the BS 101. The UE 103 performs cellular communication with the BS 101 by using a UE-BS link 106 and the UE 104 also performs cellular communication with the BS 101 by using a UE-BS link 107. When D2D communication is possible between the UE 103 and the UE 104, the UE 103 and the UE 104 can directly exchange information by using a UE-UE link 105 without passing through the BS 101.

It is assumed that the D2D communication technology using the cellular wireless mobile communication system such as the LTE-A system is executed to basically prevent a UE using the conventional cellular system from being damaged. To this end, resources which do not overlap radio resources used by a cellular UE (this refers to a UE which performs conventional device to BS communication instead of the D2D communication) may be separately used for the D2D communication. Alternatively, the D2D UE uses the same resources used by the cellular UE but the resources are used to avoid interference to each other as maximally as possible.

A backward/forward duplexing method used by the LTE or LTE-A system includes Frequency Division Duplexing (FDD).

In FDD, forward and backward directions are distinguished by using different frequency resources. When a system using the FDD uses different resources for the D2D communication and the conventional cellular communication, backward frequency resources are more preferentially used for the D2D communication between forward and backward frequency resources in general. This is because many more types of signals are multiplexed to the forward frequency resources in comparison with the backward frequency resources. As a result, it is difficult to separately allocate the forward frequency resources for the purpose of the D2D communication in comparison with the backward frequency resources.

Further, in the FDD system considering only the conventional cellular UE, forward traffic is greater than backward traffic due to the nature of a communication system and forwardly transmitted overheads are greater than backwardly transmitted overheads, so that using the forward frequency resources generally have a heavier burden in comparison with using the backward frequency resources. Accordingly, when the forward resources allocated for the purpose of the D2D communication are used, a burden of the forward resources becomes greater and thus it may be more difficult to adjust a balance between use of the forward and backward resources.

If it is assumed that the communication system using FDD performs the D2D communication by using the backward resources, the problems generated when the D2D communication technology uses the forward resources can be solved. However, all problems cannot be solved when the D2D communication technology using the backward resources is applied. For example, as the backward resources used by the LTE system, a predetermined size of resources may be allocated to both ends of an entire band to transmit control information for the conventional cellular UE.

The backwardly transmitted control information may include forward link Channel Quality Information (CQI) of the UE, ACK/NACK information corresponding to response information for a Hybrid Automatic Repeat reQuest (HARQ) technology of the forward communication, scheduling request information for backward information transmission, and the like.

The control information is transmitted in a backward direction, that is, from predetermined UEs to the BS. The transmission of the control information may be performed when the D2D UEs communicate with each other as well as when only the cellular UEs communicate by the backward resources. That is, a plurality of D2D UEs may communicate with each other and a cellular UE may transmit control information to the BS within the same cell at the same time (for example, within the same subframe in LTE). Of course, in the above case, frequency resources used for control information transmission by the cellular UE and frequency resources used for D2D communication by the D2D UE may be different from or the same as each other.

FIG. 2 is a view illustrating a scenario where the cellular UE and the D2D UE within the same cell simultaneously transmit/receive a signal to/from the BS by using backward resources on the same subframe.

A BS 201 has a cell 202 and UEs 203, 205, and 206 are located within the cell 202. The UE 203 transmits backward control information to the cellular UE by using backward resources 204. The UE 205 performs the D2D communication with the UE 206 and can transmit information to the UE 206 by using a D2D link 207. At this time, the UE 203 properly sets transmission power for the information transmission such that the BS 201 has proper reception power in receiving the backward control information. Further, the UE 205 properly sets transmission power for the information transmission such that the UE 206 has proper reception power in receiving the D2D transmission.

In this event, as a distance between the UE 205 and the UE 206 becomes larger, the UE 205 may perform the D2D transmission after setting large transmission power for proper transmission to the UE 206. At this time, when the UE 205 is located very close to the BS 201, the D2D transmission to the UE 206 by the UE 205 may be received by the BS 201 with very large reception power.

At this time, when the reception power (reference numeral 208) that the BS 201 receives from the UE 205 is greater than a signal backwardly transmitted by the cellular UE 203 by a predetermined value or more, reception sensitivity deterioration (desensing phenomenon) occurs in the reception of the signal and thus the backward control information transmitted by the UE 203 may not be received by the BS 201.

As described above, a problem exists when the cellular UE and the D2D UE included in one BS simultaneously perform transmission by using backward frequency resources, as a difference between intensities of signals which the BS receives from the cellular UE and the D2D UE is large, and thus the BS cannot receive information transmitted from the cellular UE.

SUMMARY OF THE INVENTION

The present invention has been made to solve the above problems and disadvantages and to provide at least the advantages described below.

Accordingly, an aspect of the present invention is to provide a process of controlling power of a D2D channel required for simultaneously performing communication by a UE using a D2D technology and a cellular UE while the UEs do not generate a reception sensitivity deterioration problem between them in a mobile communication system, a process in which one UE simultaneously transmits D2D data and cellular data, and operation methods and apparatuses of a BS and the UEs for supporting the processes.

In accordance with an aspect of the present invention, a method performed by a first terminal in a wireless communication system is provided. At least one parameter associated with a sidelink transmission is received from a base station. It is identified whether an uplink transmission is scheduled in a transmission time interval (TTI) in which a sidelink transmission to a second terminal is scheduled. The sidelink transmission is transmitted to the second terminal in the TTI in case that no uplink transmission is scheduled in the TTI. The sidelink transmission is transmitted based on a smaller transmission power value from two transmission power values.

In accordance with another aspect of the present invention, a first terminal is provided in a wireless communication system. The first terminal includes a transceiver configured to transmit and receive a signal, and a controller. The controller is configured to receive, from a base station, at least one parameter associated with a sidelink transmission, identify whether an uplink transmission is scheduled in a TTI in which a sidelink transmission to a second terminal is scheduled, and transmit, to the second terminal, the sidelink transmission in the TTI in case that no uplink transmission is scheduled in the TTI. The sidelink transmission is transmitted based on a smaller transmission power value from two transmission power values.

BRIEF DESCRIPTION OF THE DRAWINGS

The foregoing and other aspects, features and advantages of the present invention will become more apparent from the following detailed description when taken in conjunction with the accompanying drawings in which:

FIG. 12 is a flowchart illustrating an order of a multiplexing operation of a UE according to another embodiment of the present invention.

DETAILED DESCRIPTION OF EMBODIMENTS OF THE PRESENT INVENTION

Hereinafter, an embodiment of the present invention will be described in detail with reference to the accompanying drawings. In the following description of the present invention, a detailed description of known functions or configurations incorporated herein will be omitted when it may make the subject matter of the present invention unclear.

Meanwhile, terms described below are defined in consideration of the functions of the present invention, but the meaning of the terms may be changed according to a user, intention of an operator, or convention. Therefore, its definition will be made based on the overall contents of this specification.

Further, the detailed description of embodiments of the present invention is made mainly based on a wireless communication system based on Orthogonal Frequency Division Multiplexing (OFDM), particularly the 3GPP EUTRA standard, but the subject matter of the present invention can be applied to other communication systems having a similar technical background and channel form after a little modification without departing from the scope of the present invention, and the above can be determined by those skilled in the art.

In embodiments of the present invention described below, a Base Station (BS) or a cell may have the same meaning. Further, Device to Device (D2D) communication may be used to define all of a discovery operation for discovering adjacent User Equipments (UEs) and direct communication in which UEs directly exchange information.

In the above description, it has been discussed that the D2D communication supports backward frequency resources when it is assumed that a duplexing method to which the present invention is applied corresponds to an FDD system.

Figure 3:
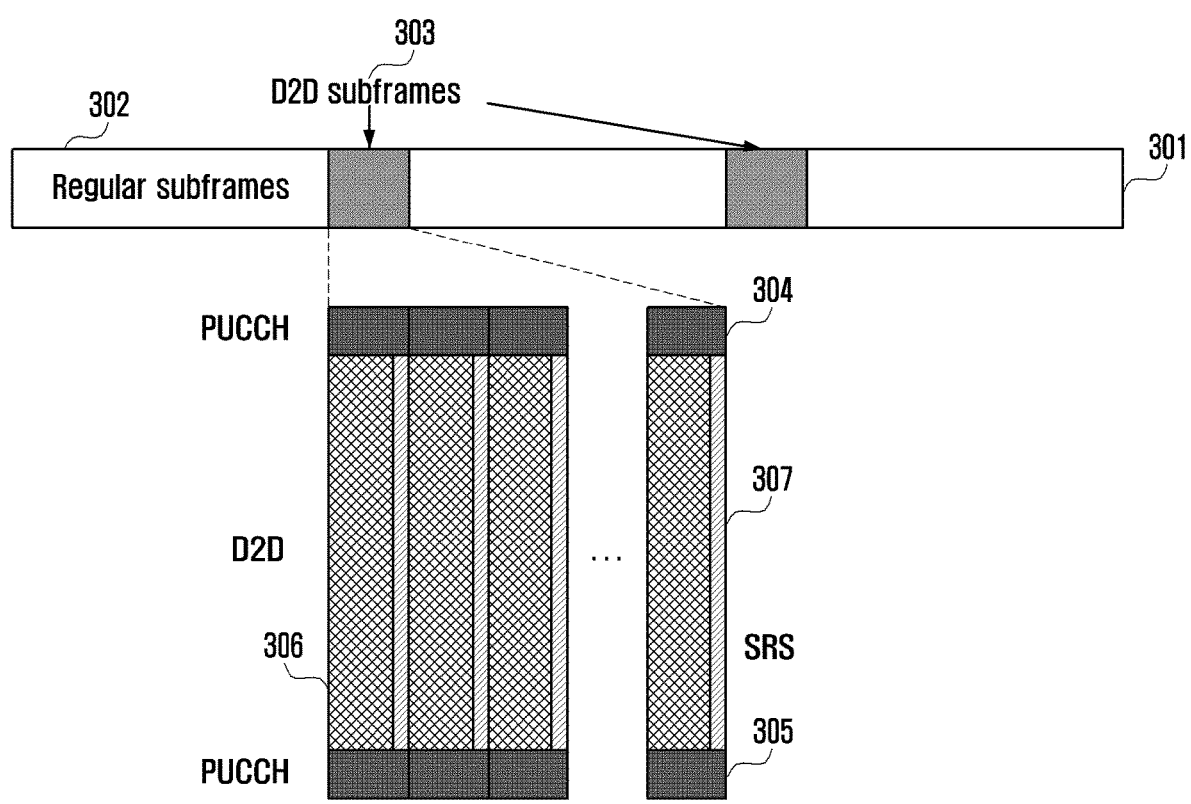
FIG. 3 is a diagram illustrating distinguished resources which can be used for D2D communication by using a format of backward resources supported by LTE according to an embodiment of the present invention.

FIG. 3 is a view illustrating distinguished resources which can be used for the D2D communication by using a format of backward resources supported by current LTE.

FIG. 3 shows a plurality of subframes 301 gathering on a time axis. The subframe refers to a time unit used in LTE and indicates a 10 ms time interval including a plurality of symbols. The present invention describes the subframe used in LTE as an example, but the present invention is not limited thereto and can use another time unit.

It is assumed in the present invention that a part of a set of the subframes 301 is used as resources for the D2D communication. That is, in FIG. 3, regular subframes 302 are allocated for the cellular communication and D2D subframes 303 are allocated for the D2D communication.

Specifically describing the resources for the D2D subframes 303, a plurality of subframes are included in the backward resources for the D2D communication. One subframe includes a plurality of Orthogonal Frequency Division Multiplexing (OFDM) symbols or Single-Carrier Frequency Division Multiplexing (SC-FDM) symbols on a time axis and a plurality of subcarriers on a frequency axis.

As described above, among available subcarriers on the frequency axis of the LTE backward resources, a plurality of subcarriers 304 and 305 located at both ends are used for transmission of backward control information (this refers to the Physical Uplink Control CHannel (PUCCH) in LTE). As described in the background art, the backward control information may include forward link Channel Quality Information (CQI) of the UE, AKC/NACK information corresponding to response information for a Hybrid Automatic Repeat reQuest (HARQ) technique of the forward communication, scheduling request information for backward information transmission, and the like.

In contrast, the D2D communication can be performed through a plurality of subcarriers 306 located at a center of the frequency axis except for both ends of the subframes. At this time, a last OFDM symbol (or SC-FDM symbol) located at each of the subframes may be used for transmission of a Sounding Reference Signal (SRS) required for backward channel estimation of UEs by the BS. Since a transmission period of the SRS varies depending on a setting of the BS, a subframe including the SRS may exist and also a subframe which does not include the SRS may exist. The subframe which does not include the SRS may use the last symbol 307 as the resources for the D2D communication or as a transition time required for an operation of changing transmission to reception or reception to transmission since the UE is required to continuously perform the transmission and reception due to the nature of D2D communication.

Figure 1:
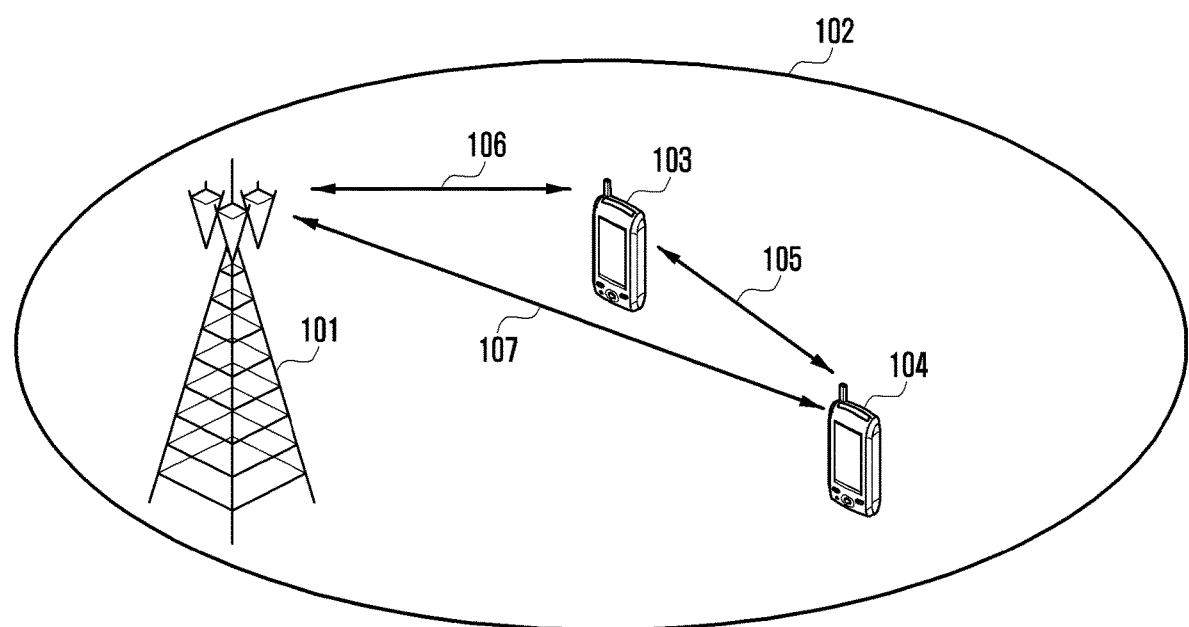
FIG. 1 is a view basically illustrating Device to Device (D2D) communication.
Figure 2:
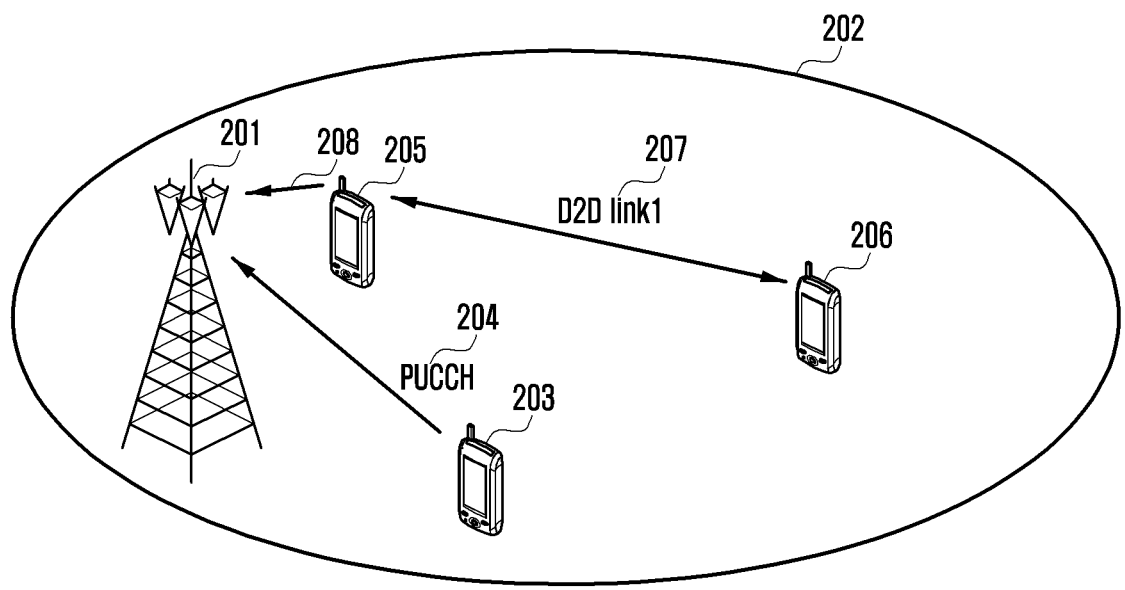
FIG. 2 illustrates backward frequency resources used as D2D resources.

A reception sensitivity deterioration (desensing) phenomenon may be described based on the backward resources illustrated in FIG. 3 with reference to FIG. 2. That is, when the cellular UE 203 transmits the PUCCH 204 to the BS 201 in a state where the UE 205 located close to the BS 201 performs transmission to the faraway UE 206 through the D2D communication channel 207 by using D2D resources, the BS 201 may not accurately receive the PUCCH 204 transmitted by the UE 203 due to the reception sensitivity deterioration phenomenon. This is because reception intensities of one or more signals received by the BS 201 may have a difference greater than or equal to a predetermined value. That is, the difference results from a case where, when a signal 208 transmitted by the UE 205 reaches the BS 201, the reception intensity is very large. Accordingly, through the following embodiments, the present invention provides a method of solving the state where the BS cannot receive information of the cellular UE due to communication of the D2D UE.

Prior to a description of a transmission power control provided by the present invention, a method of controlling transmission power when a transmitter and a receiver generally communicate with each other, particularly when the transmitter is a UE, will be first described. Transmission power used when the UE transmits a predetermined channel to the BS may be determined as a smaller value between two parameters below.

1. Maximum available power of the transmitter (UE)

2. Transmission power which can meet desired reception power when the receiver (BS) receives signals transmitted by transmitter (UE)

The maximum available power of the transmitter (that is, the UE) may be power which is limited by hardware of the UE and can be physically used by the transmitter for information transmission or maximum power determined by a predetermined setting of the BS. The receiver (that is, the BS) makes an effort to adjust reception power of the UE to a predetermined value. This is to prevent the reception sensitivity deterioration phenomenon when signals of several UEs are simultaneously received and also makes scheduling for transmission of the UE easy. Accordingly, the UE limits transmission power to adjust reception power of the BS to a predetermined value.

Therefore, the transmission power of the UE may be determined by the two parameters and the transmission power of the UE may be expressed by the following Equation (1):

$$\text{Tx\_Power}=\min\{\text{Max\_Tx\_Power}, f(\text{Rx\_Power})\} \quad (1)$$

In the above Equation (1), Tx_Power denotes transmission power of the UE, Max_Tx_Power denotes maximum available power of the UE, Rx_Power denotes reception power of the BS receiving a transmission signal of the UE, and a function f(Rx_Power) denotes transmission power determined by the UE when Rx_Power is determined. The function f(Rx_Power) may be variously determined using Rx_Power and a most representative Equation (2) is as follows.

$$f(\text{Rx\_Power})=\text{Rx\_Power}+\text{Prop\_loss} \quad (2)$$

In the above Equation (2), Prop_loss refers to a path loss according to a distance between the transmitter and the receiver and is determined by statuses of positions of the transmitter and the receiver and a medium existing between the transmitter and the receiver as well as the distance between the transmitter and the receiver. The UE detects the path loss between the UE and the BS by measuring reception power of a reference signal transmitted by the BS and then measuring transmission power of the reference signal transmitted by the BS. The path loss is a value measured in the long term. A path loss value measured forwardly can be used for controlling backward transmission power since it may be assumed that backward and forward path losses are the same.

The above Equation (2) f(Rx_Power) may be defined using other parameters as well as the path loss value. The parameters may include, for example, an amount of resources of transmitted channels (for example, a number of Physical Resource Blocks (PRBs) defined in LTE), a predetermined offset value set by the BS, and other several parameters. The Equation (2) f(Rx_Power) is calculated by assigning a predetermined weight to each of the parameters and adding the weight and the parameter. The weight may be changed or set by the BS, and may have a positive value or a negative value.

Hereinafter, a method of solving the reception sensitivity deterioration phenomenon of the BS through a control of power of the D2D UE will be described through various embodiments.

First Embodiment: D2D Channel Power Control

The present embodiment provides a method of, when the UE performing the D2D communication transmits a signal through a D2D link (the link according to the present invention refers to a wireless path through which the transmitter and the receiver transmit information and has the same meaning as a radio link, a channel, a radio channel, a connection, and the like), supporting both the information transmission through the D2D link and a resolution of the reception sensitivity deterioration phenomenon by properly setting transmission power for the D2D link.

In a state where a predetermined BS and cellular UE exist, the cellular UE transmits predetermined control information or data information to the BS, and a D2D UE existing within the cell of the BS transmits a D2D channel at the same time or the same subframe, transmission power of the D2D UE may be determined as one value of the following three parameters, and may be determined as the smallest one of the following three parameters according to an embodiment of the present invention.

1. Maximum available power of a transmission D2D UE (205 of FIG. 2)
2. Transmission power which can meet (set) desired reception power when a reception D2D UE (206 of FIG. 2) receives a signal transmitted by the transmission D2D UE (205 of FIG. 2)
3. Transmission power which does not cause reception sensitivity deterioration phenomenon when a BS (201 of FIG. 2) receives a signal from a cellular UE (203 of FIG. 2) in state where BS has received a signal from transmission D2D UE (205 of FIG. 2)

The maximum available power of the UE may be power which is limited by hardware of the UE and can be physically used by the transmitter for information transmission or maximum power determined by a predetermined setting of the BS. Further, there is an attempt to adjust the reception power of the reception D2D UE receiving the D2D channel transmitted from the transmission D2D UE to be proper reception power. This is done to make scheduling for transmission of the transmission D2D UE easy. The third parameter is a value which is not greater than, by a predetermined value or larger, a signal received from another cellular UE while reception power of D2D transmission is maintained at a predetermined level or lower when it is assumed that the BS receives the D2D transmission from the transmission D2D UE. In this event, the third parameter prevents a situation where reception sensitivity of the signal of the cellular UE deteriorates since the reception signal of the D2D UE becomes much greater than the reception signal of the cellular UE. The above is shown in Equation (3) below.

$$\text{Tx\_Power}=\min\{\text{Max\_Tx\_Power}, f(\text{Rx\_Power\_D2D}), g(\text{Rx\_Power\_eNB})\} \quad (3)$$

In the above Equation (3), Tx_Power denotes transmission power of the transmission D2D UE, Max_Tx_Power denotes maximum available power of the transmission D2D UE, Rx_Power_D2D denotes reception power of the reception D2D UE receiving a transmission signal of the transmission D2D terminal, and Rx_Power_2NB denotes reception power when the BS receives the transmission signal of the transmission D2D UE.

Further, a function f(Rx_Power_D2D) denotes transmission power determined by the transmission D2D UE when Rx_Power_D2D is determined and a function g(Rx_Power_eNB) denotes transmission power determined by the transmission D2D UE when Rx_Power_eNB is determined.

The function f(Rx_Power) may be variously determined using Rx_Power_D2D and a most representative Equation (4) is as follows.

$$f(\text{Rx\_Power\_D2D})=\text{Rx\_Power\_D2D}+\text{Prop\_loss\_D2D} \quad (4)$$

In the above Equation (4), Prop_loss_D2D is a path loss according to a distance between the transmission D2D UE and the reception D2D UE and is determined by statuses of positions of the transmitter and the receiver and a medium existing between the transmitter and the receiver as well as the distance between the transmitter and the receiver. The transmission D2D UE may detect the path loss by sharing information on transmission/reception of a predetermined signal arranged when the transmission and reception D2D UEs set a D2D channel and transmission power of the arranged signal.

The above Equation (4) of f(Rx_Power_D2D) may be defined using other parameters as well as the path loss value. The parameters may include, for example, an amount of resources of transmitted channels (for example, a number of Physical Resource Blocks (PRBs) defined in LTE), a predetermined offset value set by the BS or set through a channel setting between the D2D UEs, and other several parameters. The Equation (4) f(Rx_Power_D2D) is calculated by assigning a predetermined weight to each of the parameters and adding the weight and the parameter. The weight may be predetermined, set by the BS, or set through the channel setting between the D2D UEs, and may have a positive value or a negative value.

The function g(Rx_Power_eNB) may be variously defined using Rx_Power_eNB and a most representative Equation (5) is as follows.

$$g(Rx\_Power\_eNB)=Rx\_Power\_eNB+Prop\_loss\_eNB+Desense\_Offset \quad (5)$$

In the above Equation (5), Prop_loss_eNB refers to a path loss according to a distance between the transmission D2D UE and the BS and is determined by statuses of positions of the transmission D2D UE and the BS and a medium existing between the transmission D2D UE and the BS as well as the distance between the transmission D2D UE and the BS. The transmission D2D UE detects the path loss between the transmission D2D UE and the BS by measuring reception power of a reference signal transmitted by the BS and then measuring transmission power of the reference signal transmitted by the BS.

Desense_Offset is defined as a value adjusted to not deteriorate the reception sensitivity when the BS receives the D2D signal and a signal from another cellular UE together. Desense_Offset may be determined as a predetermined value in consideration of a capability of the receiver of the BS. Alternatively, Desense_Offset is set by the BS and then informed to the transmission D2D UE.

The above Equation (5) of g(Rx_Power_eNB) may be defined using other parameters as well as the path loss value. The parameters may include, for example, an amount of resources of transmitted D2D channels (for example, a number of Physical Resource Blocks (PRBs) defined in LTE), a predetermined offset value set by the BS, and several other parameters. The Equation (4) g(Rx_Power_eNB) is calculated by assigning a predetermined weight to each of the parameters and adding the weight and the parameter. The weight may be changed or set by the BS, and may have a positive value or a negative value.

Hereinafter, orders of operations of the UEs and the BS according to the first embodiment of the present invention will be described.

Figure 4:
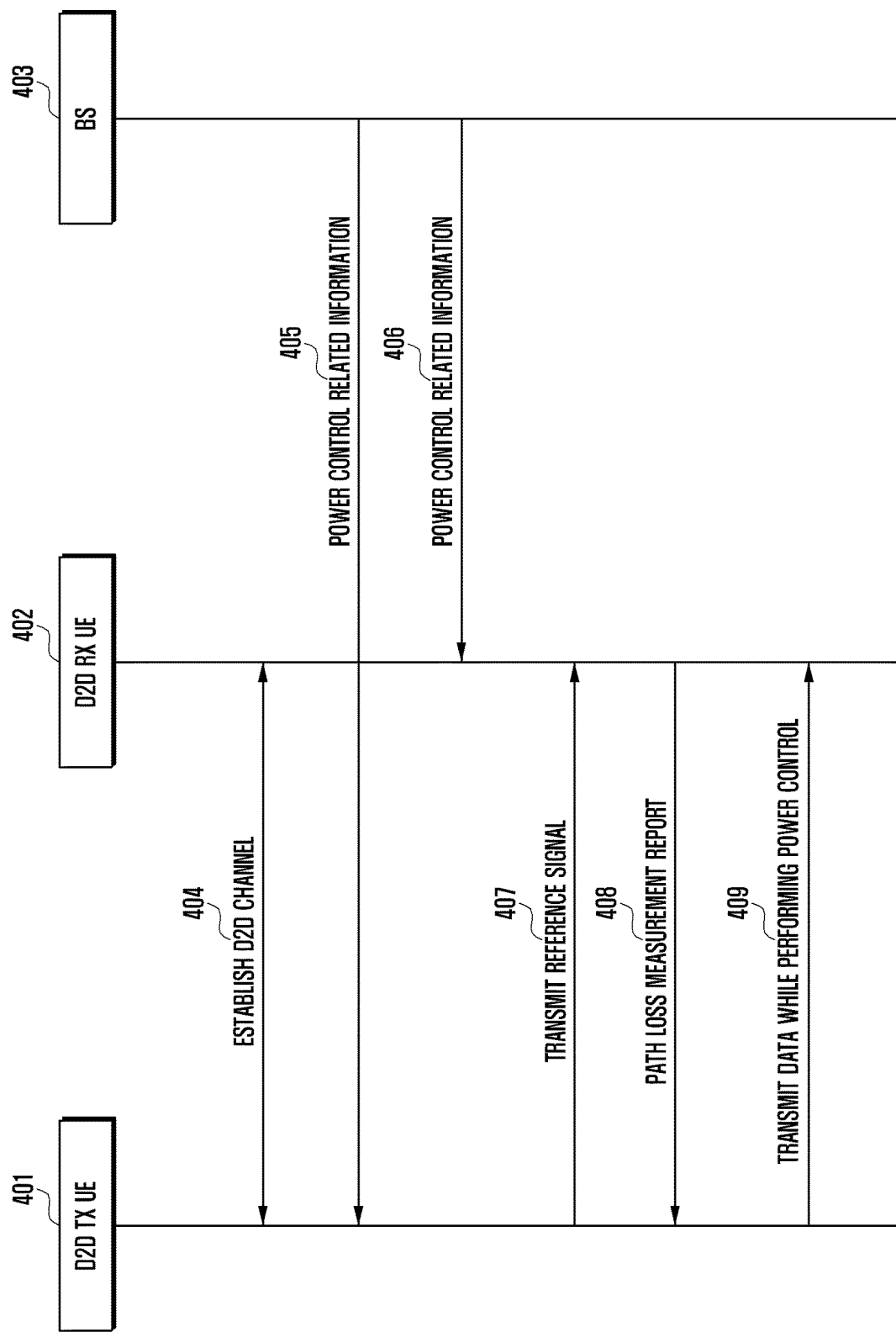
FIG. 4 is a flow diagram illustrating an order of operations of a small cell performing a network control cell inactivation process according to an embodiment of the present invention.

FIG. 4 illustrates a flowchart of processes of controlling transmission power of the D2D channel transmitted by the D2D UE.

FIG. 4 shows a transmission D2D UE 401, a reception D2D UE 402, and a BS 403. The transmission D2D UE 401 and the reception D2D UE 402 establish D2D (or a channel for D2D communication) in step 404. In step 404, information of the BS may be used. For example, in order to allow the transmission and reception D2D UEs to discover each other, perform scheduling, and actually transmit data, mutual synchronization should be made. The synchronization may be performed using primary and secondary synchronization signals (PSS and SSS) or the like transmitted by the BS.

Subsequently, the transmission D2D UE 401 receives power control related information from the BS 403 in step 405. The power control related information may include information used when f(Rx_Power_D2D) is determined in the above Equation (4) or information used when g(Rx_Power_eNB) is determined in the above Equation (5). The reception D2D UE 402 may also receive power control related information from the BS 403 in step 406. This is because the reception D2D UE 402 may be also the transmission D2D UE for the D2D channel and thus requires the power control related information. The power control related information in step 406 does not have be the same as the power control related information in step 405.

Although FIG. 4 illustrates that the BS providing the power control related information to the transmission D2D UE 401 is the same as the BS 403 providing the power control related information to the reception D2D UE 402, the present invention is not limited thereto. For example, the BSs may be different from each other when the BSs including the respective D2D UEs are different from each other.

Subsequently, the transmission D2D UE 401 and the reception D2D UE 402 may determine a path loss of the D2D channel. The path loss may be predetermined in step 404. The determination of the path loss may be shared between the transmission D2D UE 401 and the reception D2D UE 402 through reference signal transmission in step 407, a path loss calculation by the reception D2D UE 402 and a path loss measurement report in step 408.

The transmission D2D UE 401 may transmit the D2D channel by using the following Equation (6) in step 409.

$$Tx\_Power=\min\{Max\_Tx\_Power, f(Rx\_Power\_D2D), g(Rx\_Power\_eNB)\} \quad (6)$$

Figure 5:
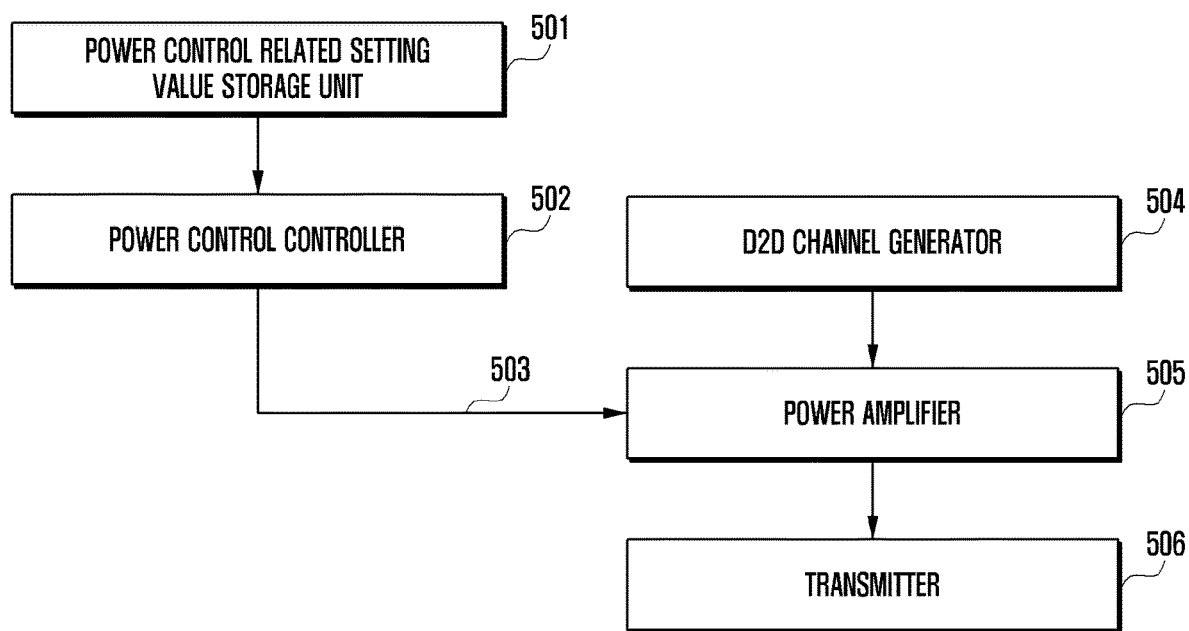
FIG. 5 is a block diagram illustrating an internal structure of a transmission device of a D2D User Equipment (UE) according to an embodiment of the present invention.

FIG. 5 is a block diagram illustrating an internal structure of the transmission D2D UE according to an embodiment of the present invention.

A storage unit 501 stores information used when power control related setting values transmitted from the BS, that is, f(Rx_Power_D2D) is determined or information used when g(Rx_Power_eNB) is determined.

The power control related information stored in the storage unit 501 is input into a power control controller 502. Then, the power control controller 502 determines transmission power of the D2D channel by using the above Equation (6) and inputs the determined transmission power of the D2D channel into a power amplifier 505 through a control signal 503.

Meanwhile, a D2D channel generator 504 generates a wirelessly transmitted signal by performing a channel encoding and modulation on information transmitted through the D2D channel. The signal is amplified by the power amplifier 505. A degree of the amplification is determined by the power control controller 502 through the use of the control signal 503. The amplified signal by the power amplifier 505 is wirelessly transmitted through a transmitter 506.

Although it has been illustrated that the power control controller 502 and the D2D channel generator 504 are distinguished as separate blocks, they do not have to be physically divided hardware and can be implemented by detailed function blocks performed by the controller.

Figure 6:
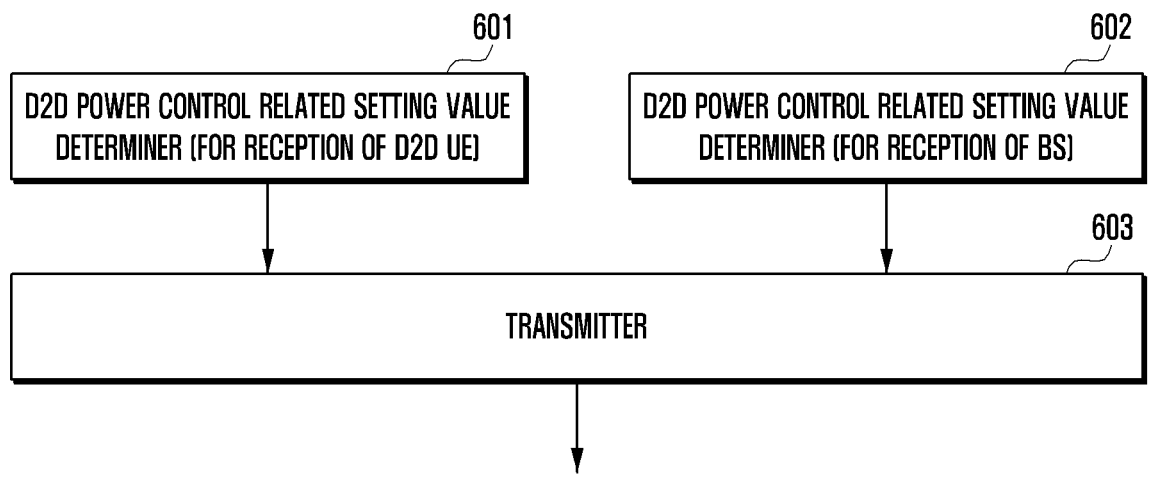
FIG. 6 is a block diagram illustrating an internal structure of a Base Station (BS) device for controlling power of a D2D UE according to an embodiment of the present invention.

FIG. 6 is a block diagram illustrating an internal structure of a BS device for controlling power of the D2D UE according to an embodiment of the present invention.

A D2D power control related setting value determiner 601 determines a power control related setting value required when the D2D UE receives the D2D channel. The power control related setting value may include information used when f(Rx_Power_D2D) is determined. Further, the D2D power control related setting value determiner 602 determines a power control related setting value required when the BS receives the D2D channel. The power control related setting value may include information used when g(Rx_Power_eNB) is determined.

The two setting values are signaled to the D2D UE through a transmitter 603. A signaling process has been illustrated in step 405 of FIG. 4. Although FIG. 6 illustrates the D2D power control related setting value determiner divided into two blocks 601 and 602, the D2D power control related setting value determiner does not have to be divided into physically separated hardware, and it should be noted that the D2D power control related setting value determiner may be implemented by detailed function blocks performed by the controller.

Second Embodiment: Control of Power of Cellular Channel when D2D Channel Exists The second embodiment of the present invention described below provides a new power control method of the cellular UE in order to solve the reception sensitivity deterioration problem of the cellular UE as the BS receives a D2D link of the D2D UE existing in an adjacent position.

It has been described that the cellular UE uses the transmission power determined according to the following Equation (7) when backwardly transmitting information by using a cellular channel.

$$\text{Tx\_Power}=\min\{\text{Max\_Tx\_Power}, f(\text{Rx\_Power})\} \quad (7)$$

In the above Equation (7), Tx_Power denotes transmission power of the UE, Max_Tx_Power denotes maximum available power of the UE, Rx_Power denotes reception power of the BS receiving a transmission signal of the UE, and a function f(Rx_Power) denotes transmission power determined by the UE when Rx_Power is determined.

The cellular UE according to the present embodiment provides a transmission power setting method using different equations according to the existence or nonexistence of the D2D UE.

That is, the method includes a scheme in which, when the D2D UE exists near the BS and the BS receives transmission of the cellular UE, the cellular UE adds an additional offset to transmission power to transmit a stronger transmission signal in order to avoid generation of the reception sensitivity deterioration problem due to the D2D UE. The present embodiment according to the above description may be expressed by the following Equation (8).

$$\text{Tx\_Power}=\min\{\text{Max\_Tx\_Power}, f(\text{Rx\_Power})+\text{offset\_D2D}\} \quad (8)$$

In the above Equation (8), Tx_Power denotes transmission power of the UE, Max_Tx_Power denotes maximum available power of the UE, Rx_Power denotes reception power of the BS receiving a transmission signal of the UE, and a function f(Rx_Power) may be transmission power determined by the UE when Rx_Power is determined. A last parameter offset_D2D corresponds to an offset having a different value according to the existence or nonexistence of the D2D UE performing simultaneous transmission with the cellular UE when the cellular UE transmits predetermined information or control information.

In general, offset_D2D may have a greater value in a case where the D2D UE performing the simultaneous transmission exists in comparison with a case where the D2D UE does not exist. For example, offset_D2D (first offset)=5 dB when the D2D UE exists, and offset_D2D (second offset)=0 dB when the D2D UE does not exist.

In addition, an effect of offset_D2D can be acquired by differently setting a parameter existing in f(Rx_Power). The Equation (9) of f(Rx_Power) may be expressed as follows.

$$f(\text{Rx\_power})=P_{0\_PUCCH}+PL_c+h(n_{CQI}, n_{HARQ}, n_{SR})+\Delta_{F\_PUCCH}(F)+\Delta_{TxD}(F')+g(i) \quad (9)$$

Parameters of $P_{0\_PUCCH}$, $\Delta_{F\_PUCCH}(F)$, and $\Delta_{TxD}(F')$ in the above Equation (9) correspond to parameters set for performance of the PUCCH by a higher layer. One or more of the parameters may be divided into two sets. Specifically, the two sets include one set used in a general subframe where D2D is not configured and the other set used in a subframe where D2D is configured. The UE may determine whether D2D exists in a subframe where the PUCCH is currently transmitted and substitute one of the two parameters (or the parameter sets) into the above Equation (9) to use the equation for PUCCH power configuration.

Offset_D2D may be set by the BS through higher layer signaling or may be set as a predetermined value. Alternatively, the UE may be informed of offset_D2D through a new Downlink Control Information (DCI) format newly defined by adding offset_D2D to a format of a conventionally set DCI. For example, offset_D2D may be transmitted to the UE through a Physical Downlink Control CHannel (PDCCH). Alternatively, without the definition of the new DCI format, the information may be transmitted to the UE by using a reserved field of a predetermined format of the conventionally defined DCI format, or the predetermined field of the conventionally defined DCI format is defined with a different interpretation and offset_D2D may be transmitted to the UE.

In the above Equation (9), the function f(Rx_Power) may be determined through the above described method.

In order to allow the cellular UE to know of the existence or nonexistence of the simultaneous transmission of the D2D UE, the BS informs all UEs included in the BS of a subframe where the D2D channel exists by using system information. Further, the BS informs each of the UEs of transmission time of the D2D UE. In this event, the UEs may be informed of the transmission time through higher layer signaling or physical layer control information.

Figure 7:
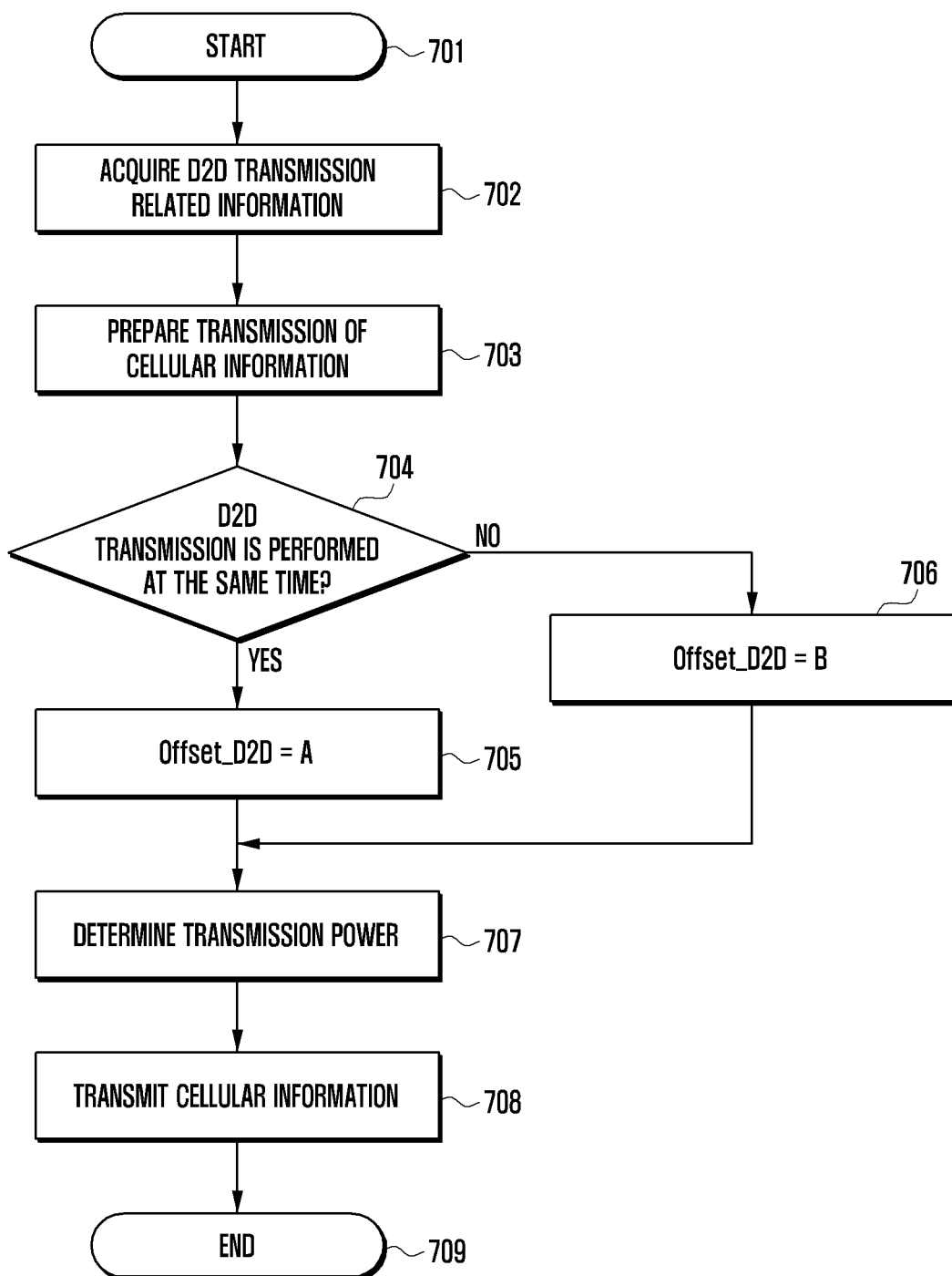
FIG. 7 is a flowchart illustrating an order of operations of a UE according to an embodiment of the present invention.

Hereinafter, orders of operations of the UEs and the BS according to the second embodiment of the present invention will be described. FIG. 7 is a flowchart illustrating an order of an operation of the UE according to the second embodiment of the present invention.

The cellular UE starts an operation in step 701, and acquires D2D transmission related information, which includes, for example, information on the time and the subframe in which the D2D transmission is performed, and offset_D2D information according to the D2D transmission in step 702.

The information on the subframe in which the D2D transmission is performed may be used for determining the subframe in which A and B corresponding to information on offset_D2D received by the UE will be used.

Further, in connection with the offset_D2D information according to the D2D transmission, when it is assumed that offset_D2D=A if the D2D UE exists and offset_D2D=B if the D2D UE does not exist, a value of (A, B) may be set to the UE.

The D2D transmission related information may be acquired from system information through a broadcast channel, and may be set to each of the UEs and informed of by the BS. In this event, higher layer signaling, such as Radio Resource Control (RRC), may be used.

The offset_D2D may be known through the system information. Alternatively, offset_D2D is set by the BS for each of the UEs and informed of by the BS. In this event, higher layer signaling, such as RRC, may be used. Alternatively, the BS may define a new DCI format including the D2D transmission related information and offset_D2D information and transmit the defined new DCI format to the UE through the PDCCH. Otherwise, without the definition of the new DCI format, the BS may transmit the information to the UE by using a field reserved for a predetermined format among the conventionally defined DCI format, or the predetermined field of the conventionally defined DCI format. The BS may also define a predetermined field of the conventionally defined DCI format with a different interpretation and transmit offset_D2D to the UE.

Subsequently, the cellular UE prepares cellular information, that is, information to be transmitted to the BS in step 703, and then determines in step 704 whether the D2D transmission is performed simultaneously at the time when the cellular information is transmitted using the D2D transmission related information acquired in step 702. For example, the UE may determine whether the subframe to transmit the cellular information is a subframe allowing the D2D transmission.

As a result of the determination, when the D2D transmission is performed together with the cellular information transmission, the UE proceeds to step 705 to set offset_D2D=A that is, an offset value required when the D2D transmission exists. In contrast, when the D2D transmission is not performed together with cellular information transmission, the UE proceeds to step 706 to set offset_D2D=B, that is, an offset value required when the D2D transmission does not exist.

Subsequently, the UE determines transmission power by using the set offset_D2D and the following Equation (10) in step 707.

$$\text{Tx\_Power} = \min\{\text{Max\_Tx\_Power}, f(\text{Rx\_Power}) + \text{offset\_D2D}\} \quad (10)$$

Further, the UE ends a transmission process in step 709 after transmitting the cellular information by using the transmission power in step 708.

Figure 8:
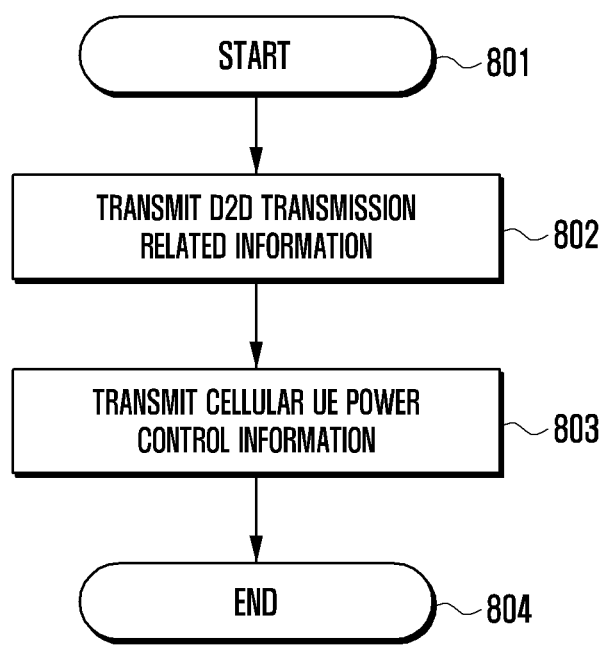
FIG. 8 is a flowchart illustrating an order of operations of a BS according to an embodiment of the present invention.

FIG. 8 is a flowchart illustrating an order of an operation of the BS according to the second embodiment of the present invention.

The BS starts the operation in step 801, and transmits D2D transmission related information, that is, information on the time and subframe through which the D2D transmission is performed in step 802. The BS transmits the power control information of the cellular UE, that is, all pieces of information related to a control of power of the cellular UE including offset_D2D information in step 803.

The UE acquires the D2D transmission related information from the system information through the broadcast channel, or the BS may inform each of the UEs of the D2D transmission related information. Similarly, the UE may know offset_D2D from the system information or the BS may set the D2D transmission related information and inform each of the UEs of the set D2D transmission related information. In another embodiment, the BS may define a new DCI format including the D2D transmission related information and offset_D2D information and transmit the new DCI format to the UE through the PDCCH. Alternatively, without the definition of the new DCI format, the BS may transmit the information to the UE by using a field reserved for a predetermined format among the conventionally defined DCI format, or define a predetermined field of the conventionally defined DCI format with a different interpretation and transmit offset_D2D to the UE.

The operation ends in step 804.

Figure 9:
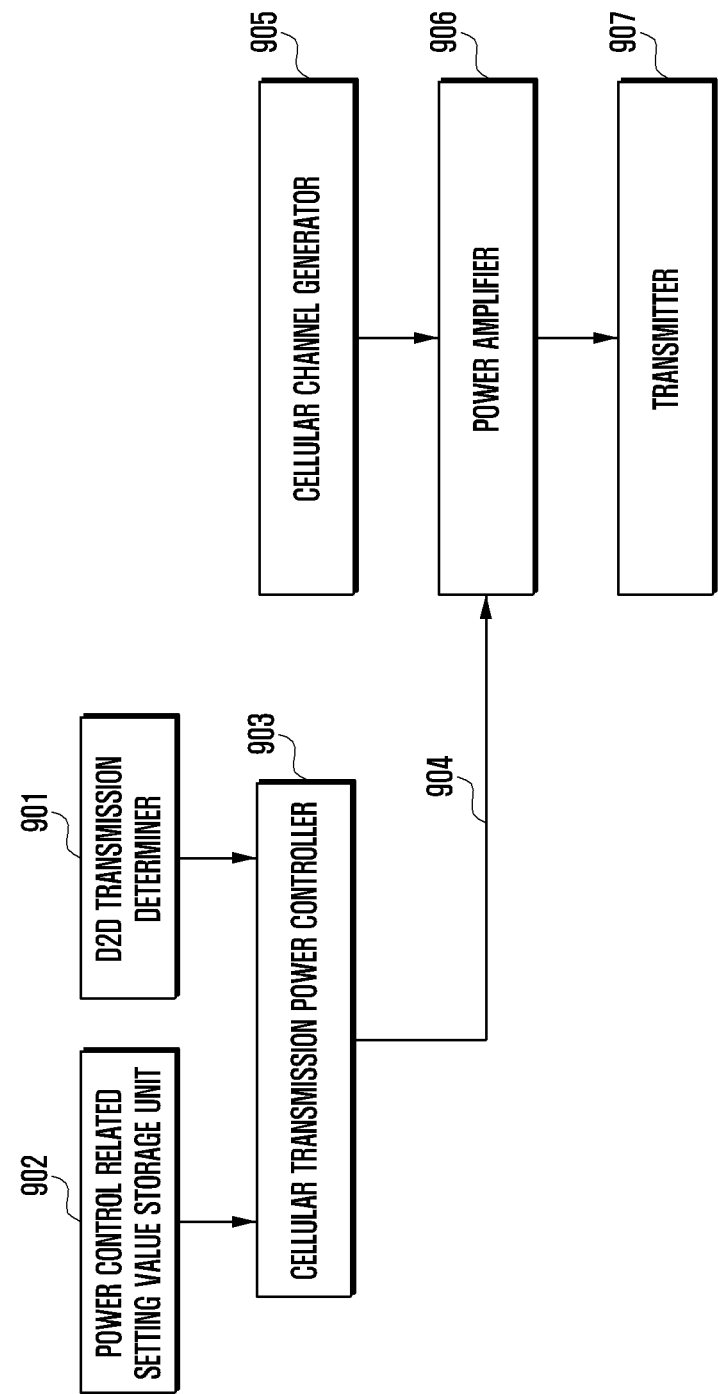
FIG. 9 is a block diagram illustrating an internal structure of a UE according to another embodiment of the present invention.

FIG. 9 is a block diagram illustrating an internal structure of a UE device according to the second embodiment of the present invention.

A D2D transmission determiner 901 determines whether the D2D transmission exists. A power control related setting value storage unit 902 stores a power control related setting value received from the BS. When determination information of the D2D transmission determiner 901 and information stored in the power control related setting value storage unit 902 are input into a cellular transmission power controller 903, transmission power of the cellular information transmitted by the UE is determined.

The offset_D2D is stored in the power control related setting value storage unit 902, and the cellular transmission power controller 903 determines an accurate value of offset_D2D according to the determination of the D2D transmission determiner 901. A channel to be transmitted by the UE is generated by a cellular channel generator 905 and amplified through a power amplifier 906. The amplified value is determined after a value determined by the cellular transmission power controller 903 is input into the power amplifier 906 through a process indicated by a reference numeral 904. The amplified cellular information is transmitted through a transmitter 907.

Each of the blocks illustrated in FIG. 9 does not have to be divided into physically separated hardware and the blocks may be implemented by detailed function blocks executed by the controller.

Figure 10:
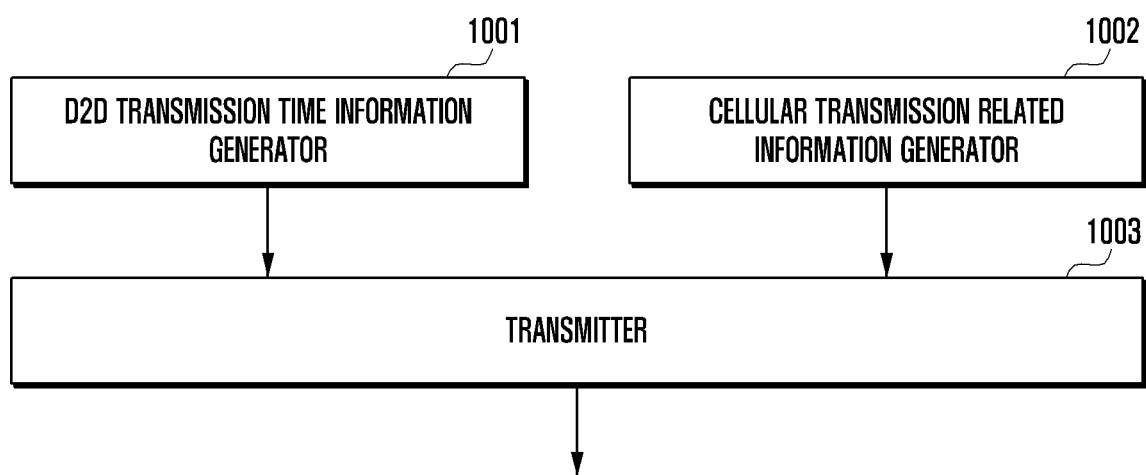
FIG. 10 is a block diagram illustrating an internal structure of a BS according to another embodiment of the present invention.

FIG. 10 is a block diagram illustrating an internal structure of a BS device according to the second embodiment of the present invention.

D2D transmission related information generated by a D2D transmission time information generator 1001 and cellular channel transmission power control related information generated by a cellular transmission related information generator 1002 are transmitted to the UE through a transmitter 1003.

Hereinafter, a method of multiplexing D2D information and cellular information provided by another embodiment will be described.

The problem in the state where the cellular UE backwardly transmits the cellular information to the BS and the D2D UE transmits information to another D2D UE by using the same backward frequency resources and the solution thereof through a control of power of the D2D UE or the cellular UE have been discussed.

Hereinafter, it is assumed that one UE simultaneously transmits or receives the D2D information and transmits the cellular information. The UE performs the general cellular transmission in which backward data information is backwardly transmitted (that is, to the BS) or control information according to forward data information is backwardly transmitted. However, simultaneous transmission or reception of the D2D information for D2D communication may be required when the cellular information is transmitted.

The cellular transmission may include data transmission and also include ACK/NACK transmission according to forward data transmission, CQI transmission, and scheduling request information.

Another embodiment of the present invention described below provides a solution when the transmission of the cellular information and the transmission of the D2D information are simultaneously generated.

Third Embodiment: Simultaneous Transmission of Cellular Channel and D2D Channel In the present embodiment, it is assumed that one UE transmits backward cellular information to the BS through a cellular channel and transmits D2D information to another D2D UE through a D2D channel at the same time. The UE uses a transmission scheme of Single Carrier Frequency Division Multiple Access (SC-FDMA).

Accordingly, it should be assumed that a number of channels simultaneously transmitted by one UE is limited to one. When the UE is required to simultaneously transmit the cellular channel and the D2D channel, the following operations are possible. Preferably, the UE may select one of the following operations and perform the selected one.

1. Transmission of only the D2D channel
2. Transmission of only the cellular channel
3. Transmission of only one channel selected from the D2D channel and the cellular channel according to a setting of the BS. In this event, when simultaneous transmission/reception of the D2D channel and the cellular channel is generated through system information, higher layer signaling such as RRC signaling, or physical layer control information, the BS may transmit information indicating a channel having a priority to the UE.
4. Simultaneous transmission of two channels regardless of the SC-FDMA scheme. At this time, transmission power is first allocated to the cellular channel and the remaining power is allocated to the D2D channel.

Fourth Embodiment: Selective Transmission of Cellular Channel and D2D Channel According to ACK/NACK In the present embodiment, it is assumed that one UE transmits backward cellular information including ACK/NACK to the BS through the cellular channel and transmits D2D information to another D2D UE through the D2D channel at the same time.

Transmitting information on ACK/NACK to the BS by the UE means that the UE informs the BS through ACK/NACK that already received forward information has been successfully received.

When the information to be transmitted to the BS by the UE corresponds to ACK between ACK and NACK, that is, when the forward information has been successfully received, the ACK information should be transmitted to the BS to avoid additional retransmission. In contrast, when the information to be transmitted to the BS by the UE corresponds to NACK between ACK and NACK, even though the NACK information is not transmitted to the BS, the BS performs retransmission of the forward information. As a result, the transmission of NACK is less important than the transmission of ACK.

Accordingly, the present embodiment provides a method in which, when one UE transmits backward cellular information including ACK/NACK to the BS through the cellular channel and transmits D2D information to another D2D UE through the D2D channel at the same time, the UE transmits only the cellular channel without transmitting the D2D channel if ACK/NACK information corresponds to ACK and transmits only the D2D channel without transmitting the cellular channel if the ACK/NACK information corresponds to NACK in consideration of the importance of ACK and NACK.

With respect to the fourth embodiment of the present invention, the operation of the UE will be described with reference to FIG. 11.

Figure 11:
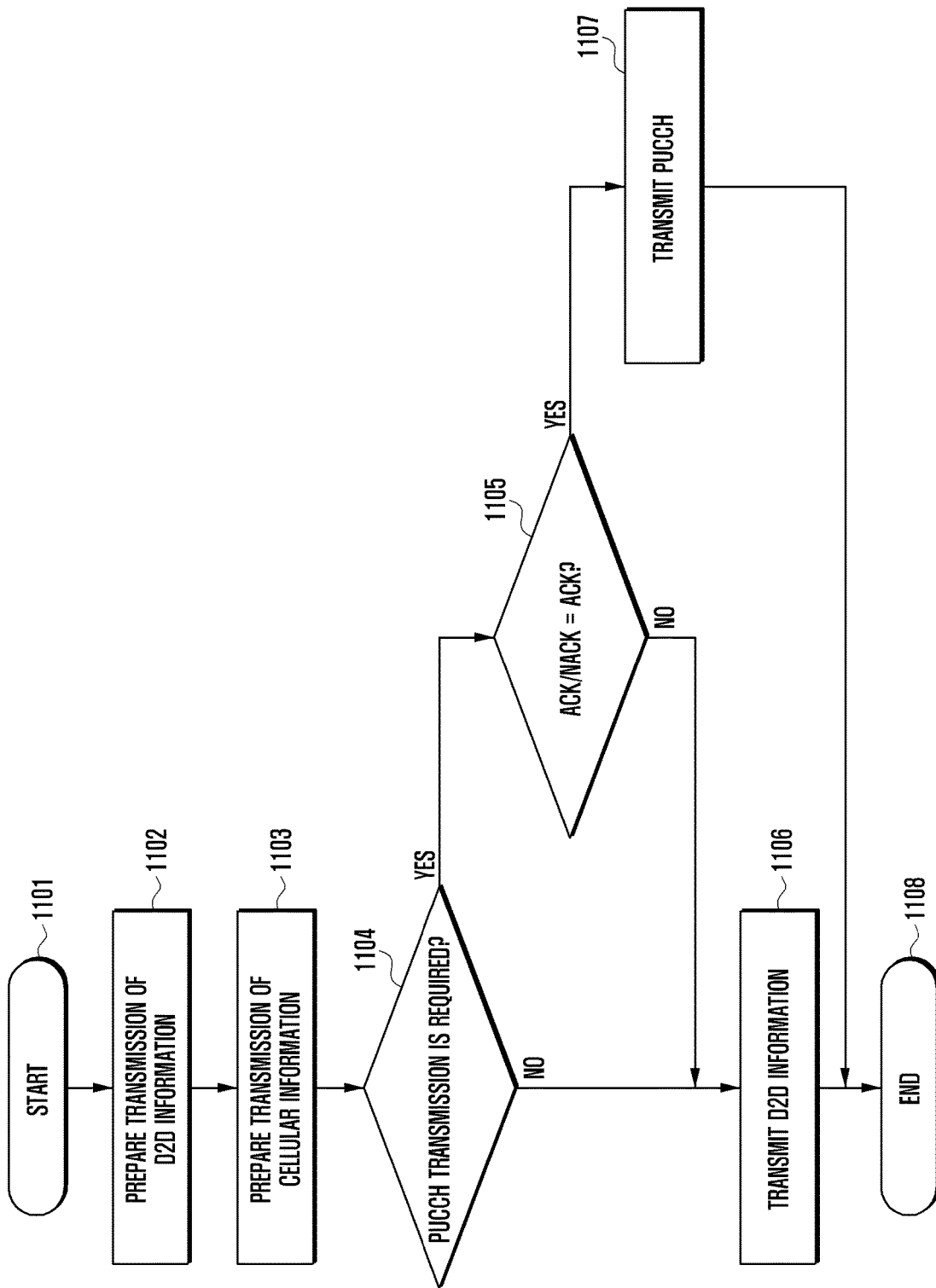
FIG. 11 is a flowchart illustrating an order of a multiplexing operation of a UE according to an embodiment of the present invention.

In FIG. 11, when the UE starts the operation in step 1101, the UE prepares transmission of the D2D information in step 1102. The UE prepares transmission of the cellular information as necessary in step 1103. In this event, information on the preparation of the transmission in step 1103 may include information included in the PUCCH.

Subsequently, the UE determines whether transmission of uplink control information (PUCCH) is required in step 1104. When the PUCCH transmission is not required, the UE transmits the D2D information in step 1106, and then ends the operation in step 1108. In contrast, when the UE determines that the PUCCH transmission is required, the UE determines whether ACK/NACK information included in the PUCCH is ACK or NACK again in step 1105.

At this time, when the ACK/NACK information corresponds to ACK, the UE proceeds to step 1107 to transmit the PUCCH. In contrast, when the ACK/NACK information corresponds to NACK, the UE proceeds to step 1106 to transmit the D2D information.

The UE transmits the D2D information but does not transmit the PUCCH information in step 1106, and transmits the PUCCH information but does not transmit the D2D information in step 1107.

After steps 1106 and 1107, the UE ends the operation in step 1108.

Fifth Embodiment: Selection of Simultaneous Cellular Channel Transmission and D2D Channel Reception In the present embodiment, it is assumed that one UE transmits backward cellular information to the BS through the cellular channel and transmits D2D information to another D2D UE through the D2D channel at the same time.

The UE cannot perform the transmission and the reception at the same time through the same band. Accordingly, in the present invention, when the UE is required to transmit the cellular channel and receive the D2D channel at the same time, the following operations are possible. Preferably, the UE selects one of the following operations and perform the selected one.

1. Reception of only the D2D channel
2. Transmission of only the cellular channel
3. Selection of only one from the D2D channel reception and cellular channel transmission according to a setting of the BS. In this event, the BS may transmit information indicating an operation having a priority between the cellular channel transmission and the D2D channel reception to the UE through system information, higher layer signaling such as RRC signaling, or physical layer control information.

Sixth Embodiment: Selection of Cellular Control Information Transmission and D2D Channel Reception According to Type of Cellular Control Information In the present embodiment, it is assumed that one UE transmits backward cellular information including ACK/

NACK to the BS through the cellular channel and transmits D2D information to another D2D UE through the D2D channel at the same time.

Transmitting ACK/NACK information to the BS by the UE means that the UE informs the BS through ACK/NACK that the forward information which has already been received from the BS has been successfully received.

When the information to be transmitted to the BS by the UE corresponds to ACK between ACK and NACK, that is, when the forward information has been successfully received, the ACK information should be transmitted to the BS to avoid additional retransmission. In contrast, when the information to be transmitted to the BS by the UE corresponds to NACK between ACK and NACK, even though the NACK information is not transmitted to the BS, the BS performs retransmission of the forward information. Therefore, the transmission of NACK is less important than the transmission of ACK.

Accordingly, in the present embodiment, when one UE transmits backward cellular information including ACK/NACK to the BS through the cellular channel and transmits D2D information to another D2D UE through the D2D channel at the same time, the UE transmits the cellular channel without receiving the D2D channel if ACK/NACK information corresponds to ACK and receives the D2D channel without transmitting the cellular channel if the ACK/NACK information corresponds to NACK in consideration of the importance of ACK and NACK.

The order of the operation of the UE according to the present embodiment will be described with reference to FIG. 12.

In FIG. 12, when the UE starts the operation in step 1201, the UE prepares reception of the D2D information in step 1202 and prepares transmission of the cellular information as necessary in step 1203. The cellular information in step 1203 may include information included in the PUCCH.

The UE determines whether the transmission of the PUCCH is required in step 1204. As a result of the determination, when the PUCCH transmission is not required, the UE receives the D2D information in step 1206, and then ends the operation in step 1208.

In contrast, when the UE determines that the PUCCH transmission is required, the UE determines whether ACK/NACK information included in the PUCCH is ACK again in step 1205. At this time, when the ACK/NACK information corresponds to ACK, the UE proceeds to step 1207 to transmit the PUCCH. In contrast, when the ACK/NACK information corresponds to NACK, the UE proceeds to step 1206 to transmit the D2D information.

The UE receives the D2D information but does not transmit the PUCCH information in step 1206, and transmits the PUCCH information but does not receive the D2D information in step 1207. When step 1206 or 1207 is completed, the UE ends the operation in step 1208.

According to an embodiment of the present invention, the state where the UE performing the conventional cellular communication experiences the reception sensitivity deterioration phenomenon can be prevented by controlling transmission power of the UE performing the D2D communication. According to another embodiment of the present invention, operations of the UE in a case where one UE is required to simultaneously perform the cellular communication and the D2D communication can be clearly defined.

Embodiments of the present invention disclosed in the present specification and the accompanying drawings are just specific examples for easily describing the technical contents of the present invention and helping understanding of the present invention, but the present invention is not limited thereto. It is obvious to those skilled in the art to which the present invention pertains that other modified embodiments in addition to the embodiments disclosed herein may be made based on the technical spirit of the present invention.

What is claimed is:

1. A method performed by a first terminal in a wireless communication system, the method comprising:
   receiving, from a base station, at least one parameter associated with a sidelink transmission;
   identifying whether the terminal is configured to simultaneously transmit an uplink transmission and the sidelink transmission;
   transmitting, to a second terminal, the sidelink transmission in case that no uplink transmission is configured, wherein a transmission power for the sidelink transmission is identified from two or more transmission power values; and
   transmitting, to a base station, the uplink transmission in case that the terminal is configured to simultaneously transmit the uplink transmission and the sidelink transmission,
   wherein the sidelink transmission is not transmitted to the second terminal, in case that the terminal is configured to simultaneously transmit the uplink transmission and the sidelink transmission.

2. The method of claim 1, wherein the two or more transmission power values include a first transmission power value which is determined based on the at least one parameter and a second transmission power value which is a maximum available transmission power value for the sidelink transmission.

3. The method of claim 2, wherein the first transmission power is determined by further considering of a number of assigned resource blocks for the sidelink transmission, a downlink pathloss, and a power control related value.

4. The method of claim 1, wherein the transmission power for the sidelink transmission is a smallest value among the two or more transmission power values.

5. The method of claim 1, wherein the sidelink transmission includes a sidelink data transmission.

6. A first terminal in a wireless communication system, the first terminal comprising:
   a transceiver configured to transmit and receive a signal; and
   a controller configured to:
      receive, from a base station, at least one parameter associated with a sidelink transmission;
      identify whether the terminal is configured to simultaneously transmit an uplink transmission and the sidelink transmission;
      transmit, to a second terminal, the sidelink transmission in case that no uplink transmission is configured, wherein a transmission power for the sidelink transmission is identified from two or more transmission power values; and
      transmit, to a base station, the uplink transmission in case that the terminal is configured to simultaneously transmit the uplink transmission and the sidelink transmission,
   wherein the sidelink transmission is not transmitted to the second terminal, in case that the terminal is configured to simultaneously transmit the uplink transmission and the sidelink transmission.

7. The first terminal of claim 6, wherein the two or more transmission power values include a first transmission power value which is determined based on the at least one parameter and a second transmission power value which is a maximum available transmission power value for the sidelink transmission.

8. The first terminal of claim 7, wherein the first transmission power is determined by further considering of a number of assigned resource blocks for the sidelink transmission, a downlink pathloss, and a power control related value.

9. The first terminal of claim 6, wherein the transmission power for the sidelink transmission is a smallest value among the two or more transmission power values.

10. The first terminal of claim 6, wherein the sidelink transmission includes a sidelink data transmission.

* * * * *